G. H. McDONEL, J. THORN & S. EWING.
WEED-HIDER.
No. 189,374.             Patented April 10, 1877.
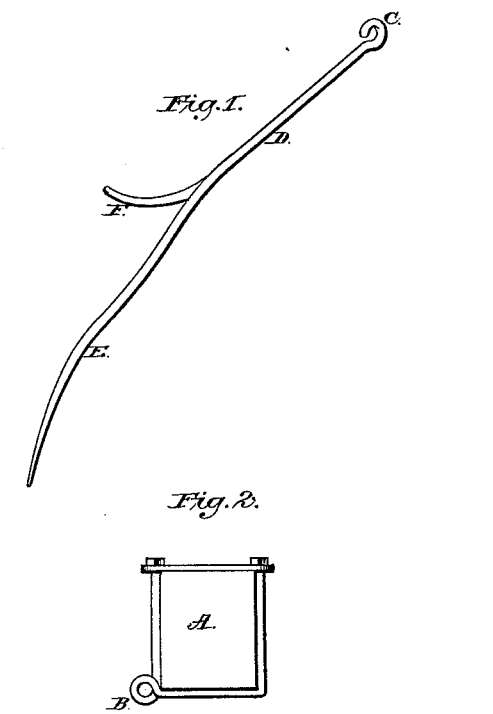
Witnesses;
J. V. Jones.
Alex Brown
Inventors:
G. H. McDonel
John Thorn
Saml Ewing

UNITED STATES PATENT OFFICE.

GEORGE H. McDONEL, JOHN THORN, AND SAMUEL EWING, OF FOSTORIA, OHIO.

IMPROVEMENT IN WEED-HIDERS.

Specification forming part of Letters Patent No. 189,374, dated April 10, 1877; application filed September 5, 1876.

*To all whom it may concern:*

Be it known that we, GEORGE H. McDONEL, JOHN THORN, and SAMUEL EWING, of Fostoria, Seneca county, and State of Ohio, have invented a Weed-Hider, of which the following is a specification:

The object of our invention is to attach the weed hider or hook represented in the draft hereto attached to the beam of any ordinary plow, for the purpose of dragging weeds, grass, or corn-stubbles nicely into the plow-furrow, so that the earth or sod when turned over by the plow will completely and entirely cover them from sight as each successive furrow is turned.

A represents an ordinary clevis attached to the plow-beam, fastened with screws and burs on top of the beam. B represents a ring in the clevis at the bottom and corner of plow-beam, to attach hook C to. C represents the hook on the weed-hider to hook into ring B. D represents the main arm of the grass-hider or hook, twenty and one-half inches in length. E represents the drag-bar of the grass-hider following along the furrow under the earth or sod turned by the plow, holding the hook F in its place. F represents the hook of the grass-hider that reaches out in the furrow and gathers the weeds, grass, or stubble into a roll and in place and shape to be completely covered as the plow passes along and turns the furrow.

The drag-bar E of the weed-hider is to be about thirty-one and one-fourth inches in length and the hook F ten inches in length.

The weed-hider hangs loosely to the plow-beam, and works equally as well in rough land as in smooth. The drag-bar in the furrow, covered with sod or loose earth, always keeps its place and governs the grass-hook F in the furrow so that it is always in its proper place with the movement of the plow, gathering the grass or weeds in a nice roll as it moves, and with the movement of the plow places them in shape to be deposited in the bottom of the furrow.

We claim—

The above-described device for covering grass and weeds, consisting of the rod D, having the hook C and the prongs E and F, in combination with the clamp A, provided with the eye B, arranged to attach the weed-turner D E F loosely to the front part of a plow-beam and allow the prongs to drag in the furrow last cut, substantially as shown and described.

G. H. McDONEL.
JOHN THORN.
SAML. EWING.

Witnesses:
J. V. JONES,
C. W. THOMAS.